[11] 3,953,982
[45] May 4, 1976

[54] METHOD AND APPARATUS FOR LAYING AND CONNECTING FLOW LINES TO SUBMERGED STRUCTURES

[75] Inventor: Michael D. Pennock, Pinner, England

[73] Assignee: Subsea Equipment Associates Limited, Hamilton, Bermuda

[22] Filed: Dec. 3, 1974

[21] Appl. No.: 529,181

[30] Foreign Application Priority Data
Dec. 5, 1973 France .............................. 73.43469

[52] U.S. Cl. .................................... 61/72.3; 166/.5
[51] Int. Cl.² ............................................ F16L 35/00
[58] Field of Search ................ 61/72.3, 46.5, 72.1; 166/.5, .6; 29/464

[56] References Cited
UNITED STATES PATENTS

| | | | |
|---|---|---|---|
| 3,547,189 | 12/1970 | Bielstein | 166/.5 |
| 3,585,958 | 6/1971 | Naczkowski | 61/48 X |
| 3,605,415 | 9/1971 | Mohlman | 166/.5 |
| 3,724,061 | 4/1973 | Schipper | 61/72.3 |

Primary Examiner—Jacob Shapiro
Attorney, Agent, or Firm—Sughrue, Rothwell, Mion, Zinn & Macpeak

[57] ABSTRACT

In a method of and apparatus for laying and connecting a flow line to a submerged base structure, wherein the end portion of the line for connection to the submerged base structure comprises an elbow portion and a connection at the end of the elbow portion, which connection is capable of pivoting about the axis of the elbow portion and forms part of a basic structure for vertical connection to the base structure, the basic structure is held fixed relative to the end portion of the line by operation of a locking apparatus rigidly connecting the elbow portion to the connection, the collector line is progressively submerged in alignment with the submerged base structure until the basic structure coincides with connecting means on the submerged base structure, and the locking apparatus is unlocked so that the elbow portion of the line can pivot freely about its axis relative to the basic structure.

23 Claims, 14 Drawing Figures

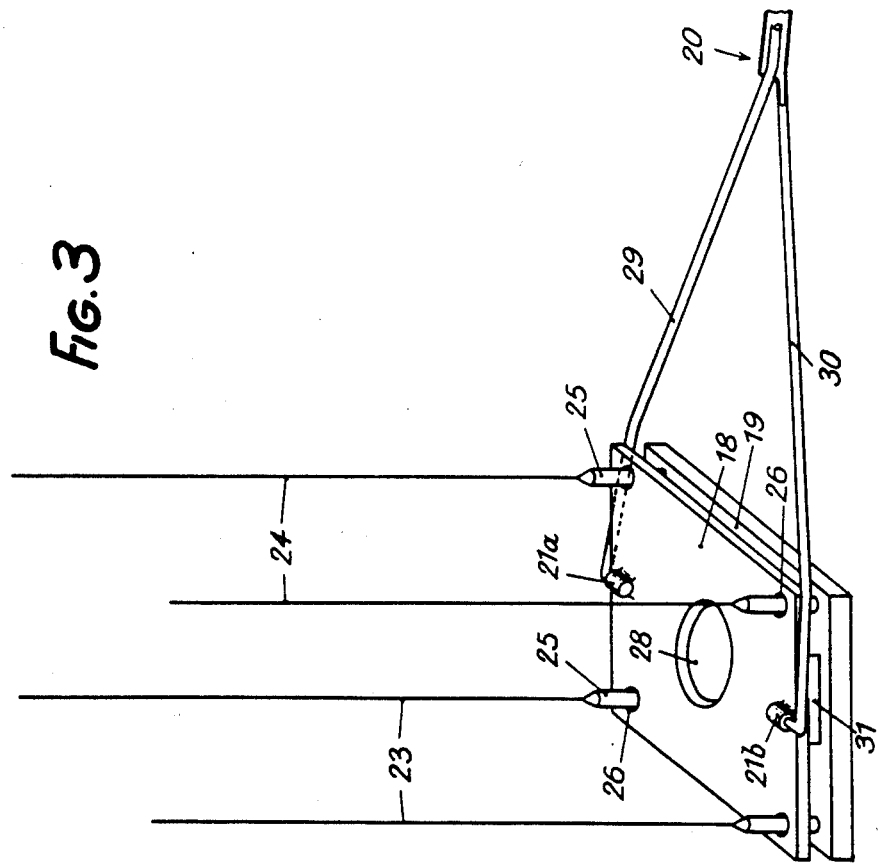
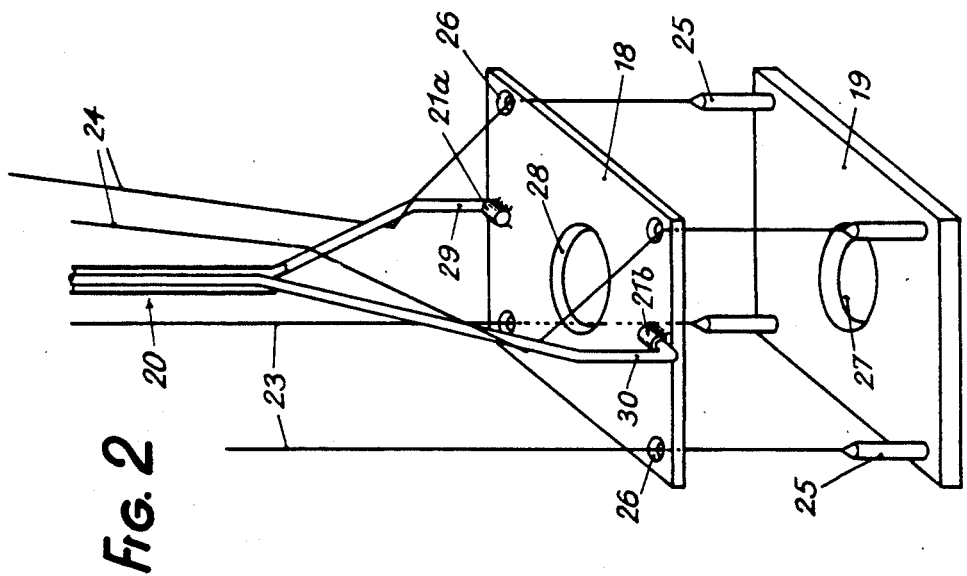

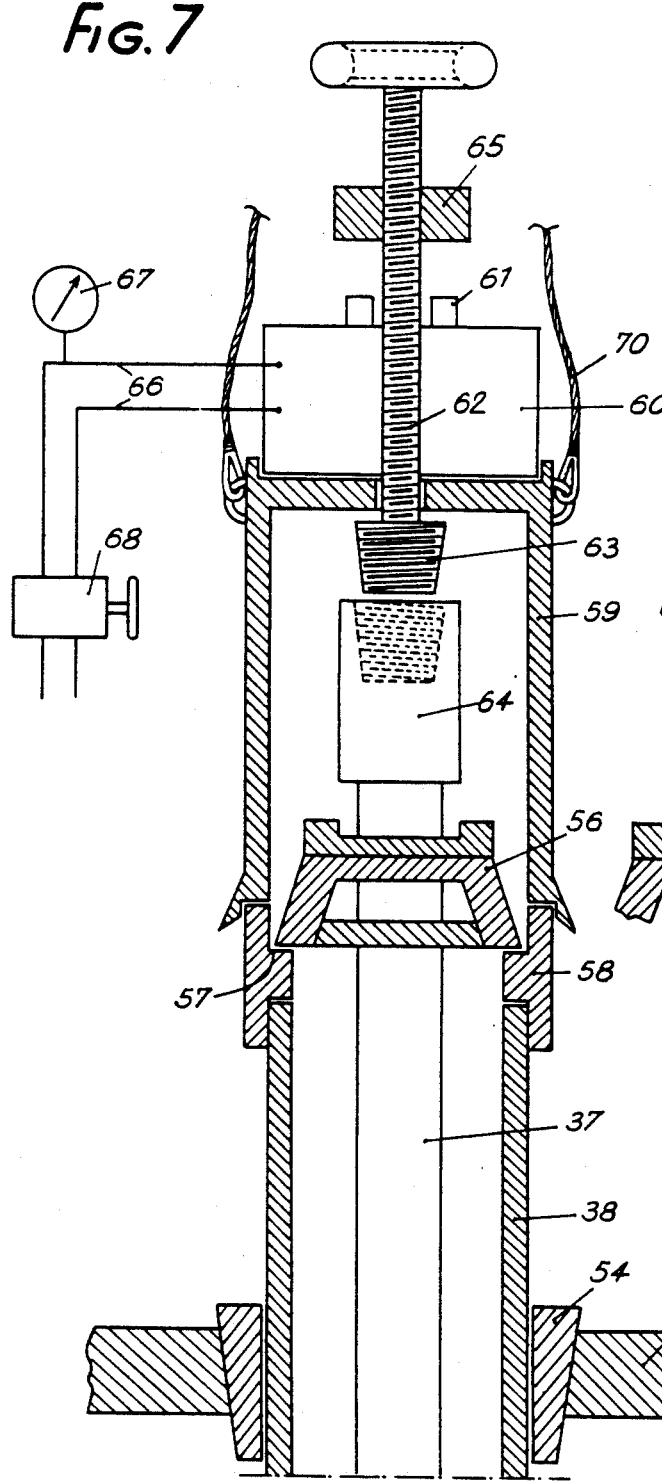
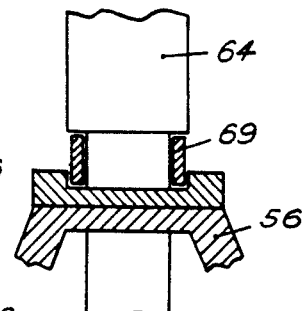
Fig. 7
Fig. 8

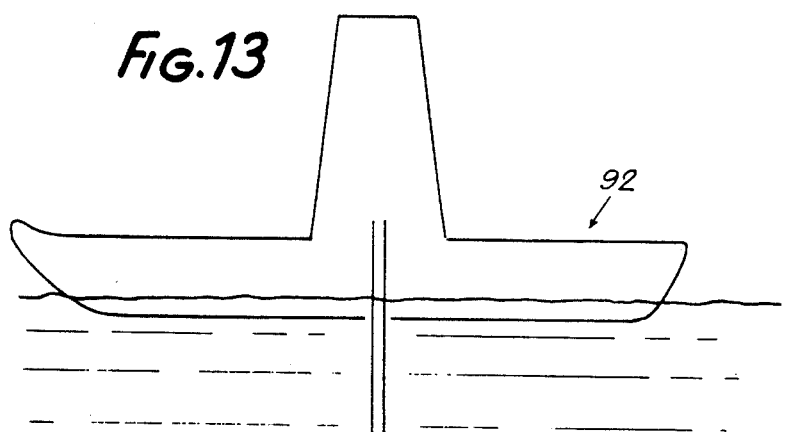
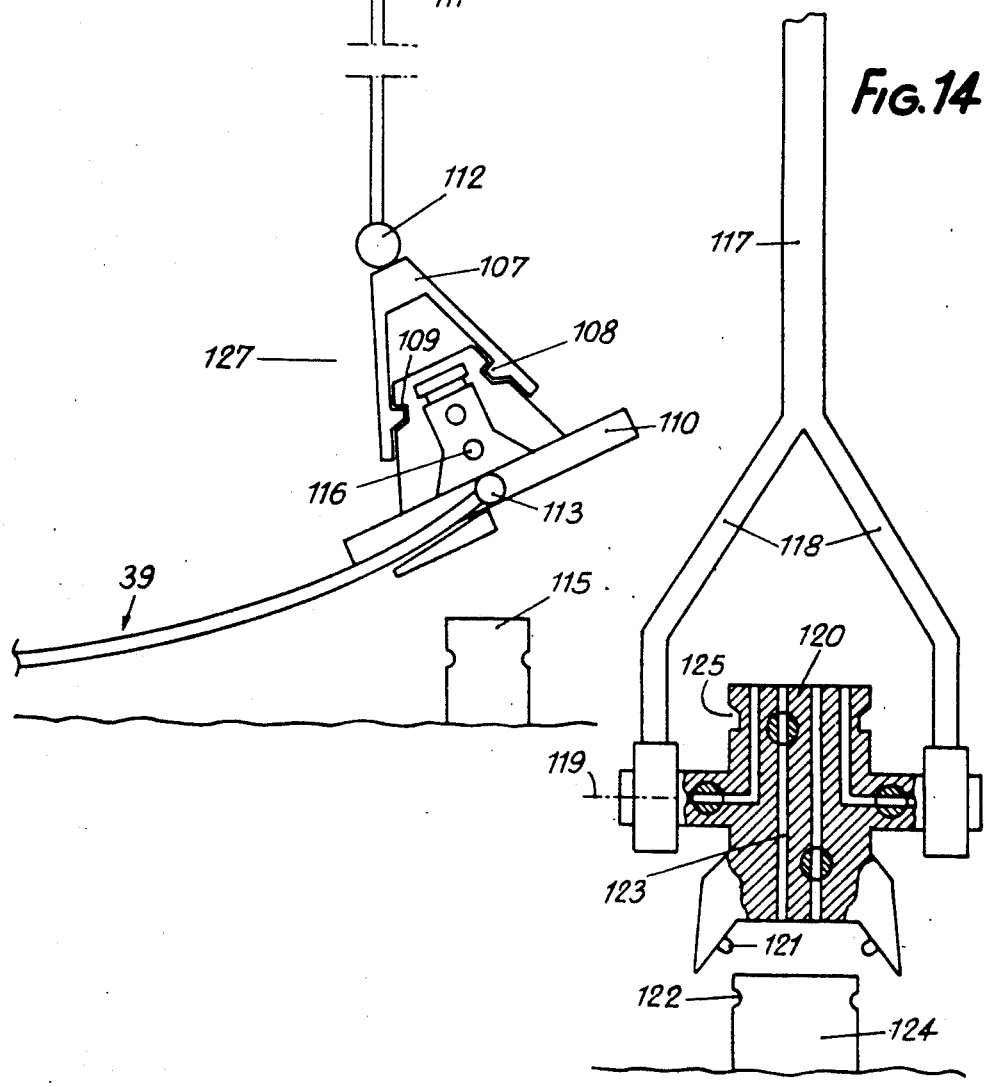

METHOD AND APPARATUS FOR LAYING AND CONNECTING FLOW LINES TO SUBMERGED STRUCTURES

The invention relates to a method of installing flow lines, in particular simple or multiple lines, and of connecting these lines to submerged structures, in particular to the head of an oil or gas well or to any unit of an assembly of a submarine production well, such as a separator, storage reservoir, treatment unit, pumping and loading equipment, etc. It relates equally to apparatus for use in the method and to a flow line.

Numerous methods of installing flow lines are in existence, but these are in general adapted to position lines at depths which are closely specified and in general shallow. As a result, they cannot be used when a line has to be positioned at depths greater than those for which they have been designed. This also applies to the means for connection of the line to a submerged structure.

Further, these methods usually necessitate special installations on board the surface gear being used, to ensure that the operations of assembly, submersion and connection are carried out.

According to one aspect of the present invention there is provided a method of laying and connecting a flow line to a submerged base structure, wherein the end portion of the line for connection to the submerged base structure comprises an elbow portion and a connection at the end of the elbow portion, the connection being capable of pivoting about the axis of the elbow portion and forming part of a basic structure for vertical connection to the base structure, the method comprising holding the basic structure fixed relative to the end portion of the line by operation of a locking apparatus rigidly connecting the elbow portion to the connection, progressively submerging the collector line in alignment with the submerged base structure until the basic structure coincides with connecting means on the submerged base structure, and unlocking the locking apparatus so that the elbow portion of the line pivots freely about its axis relative to the basic structure.

Thus, contrary to previous methods in which it was necessary to position a flow line in the direction coinciding with the axis of the connecting nozzle on the submerged structure, which necessitated in general the positioning of the line in a horizontal or nearly horizontal direction, before making the connection, in accordance with the invention, the flow line is arranged to extend in a direction which minimises or eliminates the stresses to which it and the structures are subjected, its extremity is connected to the submerged structure, and the direction of extent of the line relative to the structure is then changed. It thus becomes possible to lower the line vertically, to connect it to the structure and then to bring the line into a horizontal position, if this is the position desired after connection. Positioning is thus facilitated and the difficult problem of connections is solved.

Advantageously the line comprises a plurality of sections which are connected together as the basic structure is submerged and are inclined after the basic structure has been connected to the base structure.

The end portion of the line may comprise two branches each of which comprises an elbow pivotable in a connection, the axes of the connections being parallel.

This method permits verification on the surface of the water-tightness of the connections between sections, and by locking the end portion of the line relative to the basic structure, the precise vertical connection of the basic structure to the base structure, with the help of simple guiding means.

According to the conditions encountered, the line may be filled either partially or completely, or even closed at its upper end without filling, to bring the line to any desired inclination or to subject it to any predetermined stress distribution, the end being out of the water or submerged.

The line can be multiple and include at least one external pipe and one internal pipe, each branch of the end portion receiving one or other of these pipes. The ease of assembly of the sections of the line permits, in particular, the pre-stressing of each or some section at the time that it is assembled, and hence an increase in resistance to flexing and pressure effects and in particular to undesirable stresses in the line.

The invention will be more fully understood from the following description of an embodiment thereof, given by way of example only, with reference to the accompanying drawings, in which:

FIG. 2 is a diagrammatic perspective view of the connecting line section in course of sinking;

FIG. 3 is a diagrammatic view of the line section after positioning of the basic structure;

FIG. 7 is a view illustrating a method of traction pre-stressing part of the flow line;

FIG. 8 is a detail of FIG. 7;

FIG. 9 is a diagrammatic sectional view of the inner and outer pipe sections after assembly;

FIG. 10 is a view illustrating a method of compression pre-stressing of a portion of a flow line;

FIG. 13 is a view illustrating the raising of a flow line to the surface, and

FIG. 14 is a diagrammatic view, partly in section, of the basic structure in course of being installed.

Figure 1:
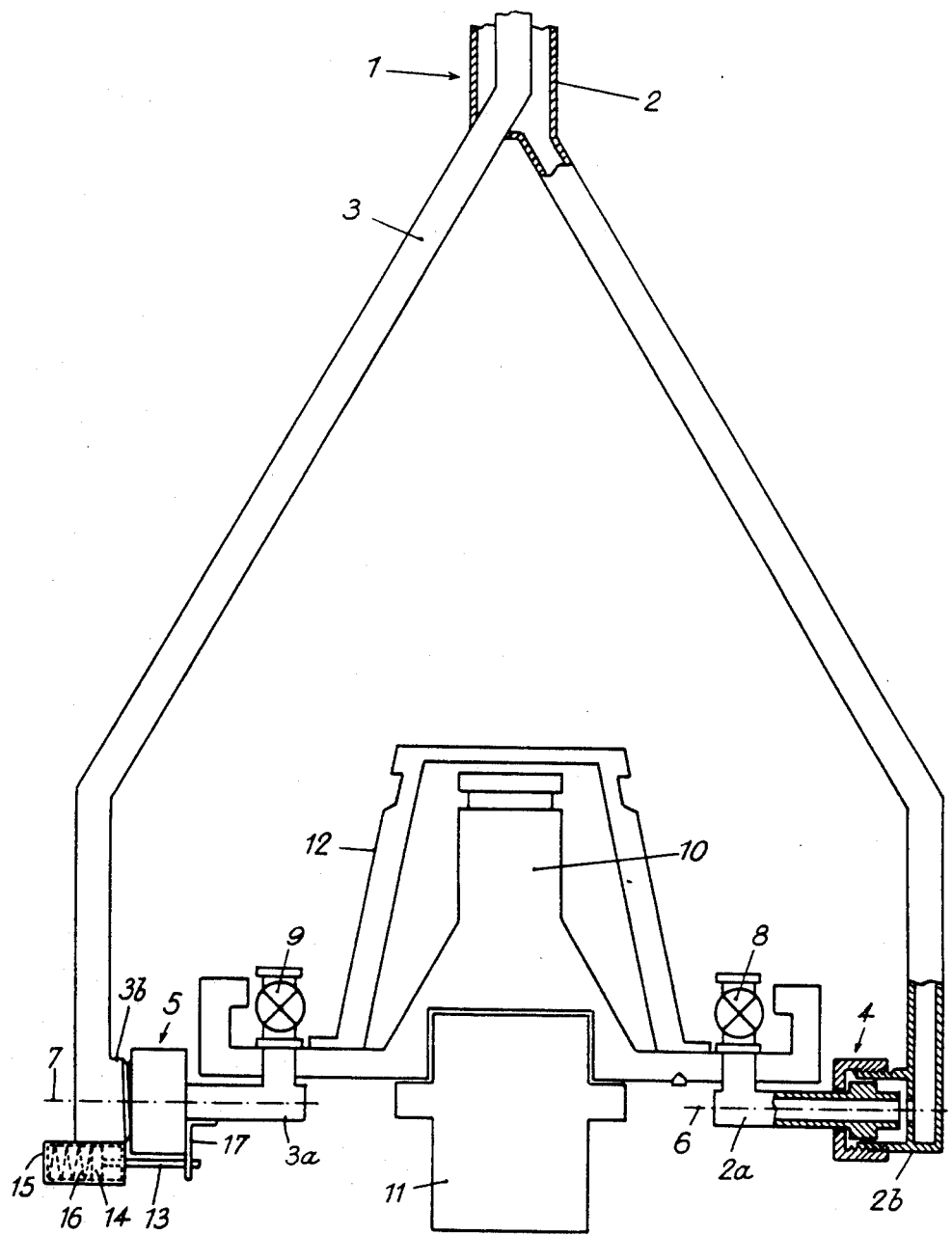
FIG. 1 is a diagrammatic side view, partly in section, of a flow line section of a double flow line, provided with its basic structure.

In the embodiment shown in FIG. 1, the flow line is double. It comprises an outer pipe 2 and an inner pipe 3 and terminates at its lower end in two divergent branches each carrying a water-tight pivotable connection 4 and 5, the axes of rotation 6 and 7 of which extend in the same direction. The relatively fixed ends 2a and 3a of the pipes 2 and 3 are rigidly connected to isolating valves 8 and 9 mounted on a basic structure 10. This structure is adapted to be positioned vertically on a submerged base 11 and may also include a guide structure 12 which may be used in positioning a complementary structure on structure 10 and also in the withdrawal of structure 10. The base 11 may, for example, be a drilling head and the structure 10 an element of the well head.

During the lowering of line 1, the pivotable connections 4 and 5 are put out of action by means of a locking device. As shown, the end 3a has been angularly fixed relative to elbow portion 3b of branch 3 by means of a shaft 13 fixed to the piston 14 of a cylinder 15. A spring 16 biases piston 14 and its shaft 13 in a direction to move the end of the shaft 13 through a hole in an angle piece 17. Thus, the elbow portions 2b and 3b of the branches 2 and 3 cannot rotate, about axes 6 and 7, during descent. When it is desired to lay the flow line 1 on the sea bed shaft 13 is released from the angle piece 17 by introducing, via a suitable conduit, fluid under pressure into the cylinder 15 on the shaft side of piston 14, so as to compress spring 16 and to disengage the end of the shaft from angle piece 17.

It will be apparent that the elbow portions 2b and 3b may be connected to one single flow line, or to a triple line or a line with more than three pipes.

In FIGS. 2 and 3, showing how a basic structure 18 may be correctly positioned on a base 19, the upper part of line 20 has not been shown. This line, like line 1 in FIG. 1, is suspended from the surface gear. Contrary to conventional methods of positioning, the flow line 20 is not placed horizontally on the bottom and then connected to the base, but it is directly suspended from the surface gear and is brought down by the usual handling means, for example draw-, so as to vertically engage the basic structure on the base.

Thus in the embodiment of FIG. 2, after the base 19 has been positioned around a drilling head for example (not shown for reasons of clarity and because it can be any structure) the basic structure 18 is lowered with the aid of line 20, guided by the cable pairs 23 and 24. For this purpose, the base 19 is provided with guide columns 25, to which are connected the cable pairs 23 and 24. Each cable passes through one of the four orifices 26 in the basic structure 18, the positions of which are such that when this structure is close to base 19, FIG. 3, the columns 25 enter the orifices 26 bringing about the coincidence of openings 27 and 28 for passage of a drilling head or any other connection structure.

The basic structure 18 includes, like structure 10 in FIG. 1, a locking device enabling the pivotable connections 21a and 21b to be released, and enabling the branches 29 and 30 to be maintained in a fixed position with respect to the structure 18 during the vertical lowering of line 20. When the structure 18 rests on the base 19, FIG. 3, branches 29 and 30 are unlocked and progressively inclined as line 20 is extended at the surface by progressively moving the upper end of the line in the direction effectively defined by the vertical plane of symmetry of branches 29 and 30.

Depending on the depth of the sea bed, it is also possible to release the branches only when the upper end of line 20 has been moved a certain distance from the vertical to the base. The movement of branches 29 and 30 is further facilitated by the cable pair 24 which is arranged, as shown in FIG. 2, in such a manner as to cause the inclination of the branches, after release, by means of traction exerted on cable pair 24 from the surface.

A stop 31 may be provided between base 19 and the basic structure 18 in such a manner as to impart to branches 29 and 30 an inclination which tends to reduce the stress in line 20, and has a slope variation.

Figure 4:
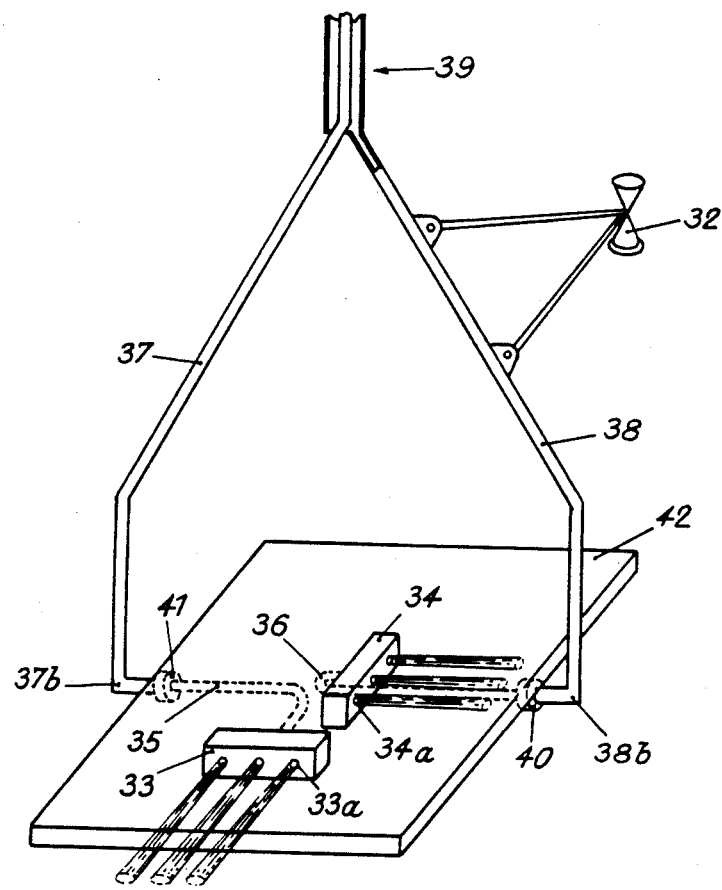
FIG. 4 is a diagrammatic view of the connecting line section provided with guiding means.

It is also possible to dispense with the guide cables 23 and 24 by use of detection means, such as sonar, shown schematically at 32 in FIG. 4, and by use of multiple means of orientation 33 and 34 which can consist of jet nozzles 33a and 34a connected temporarily or permanently by means of connections 35 and 36 to the branches 37 and 38 of the multiple line 39. These connections may be placed under the control of valves 40 and 41 controlled from the surface as a function of information provided by the sonar 32. It suffices to control the opening of the valves 40, 41 or to vary the apportionment of pressurised fluid between the pipes of the line 39 in order to exert sufficient pressure to displace structure 42 and to bring it into alignment with the base. In addition to these lateral displacements, it is possible to orient the structure in a given direction merely by rotation of the upper end of line 39.

Figure 5:
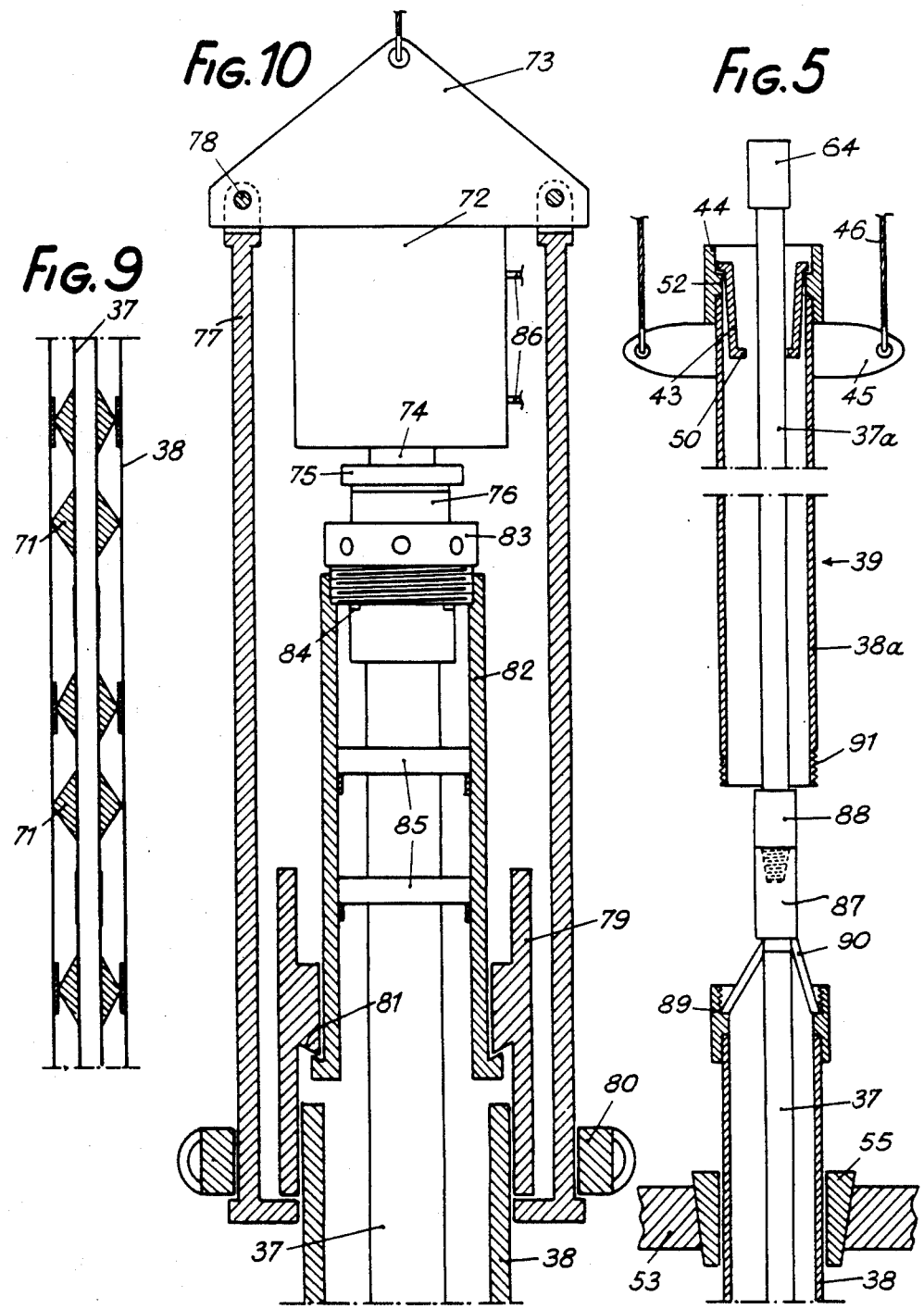
FIG. 5 is a diagrammatic sectional view of a pipe section of a double line in course of assembly.
Figure 6:
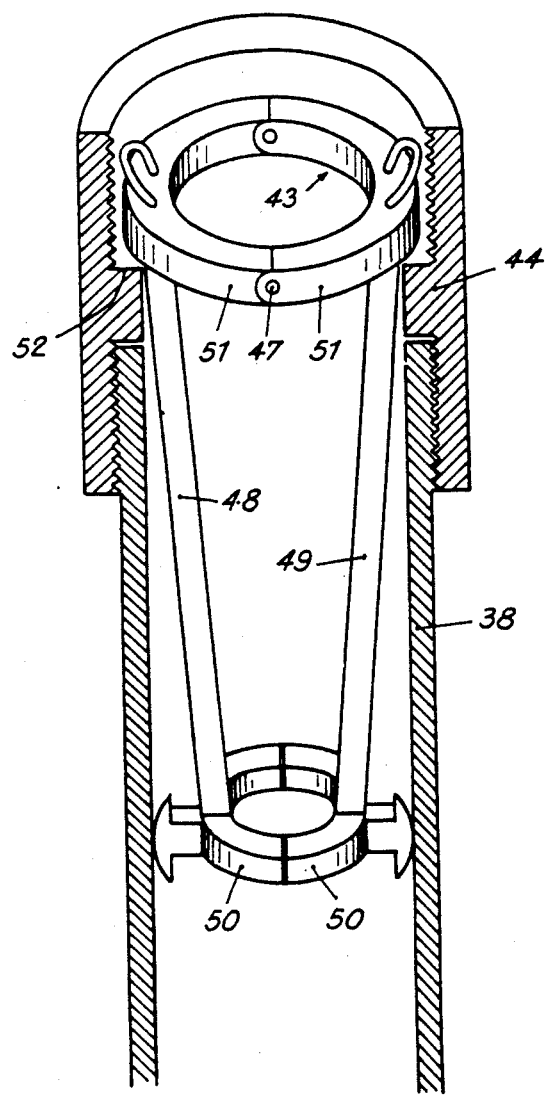
FIG. 6 is a diagrammatic view, partly in section, of a support for the inner pipe of a double flow line.

In order to facilitate the assembly of a multiple line, the inner and outer pipe sections are staggered, as shown in FIGS. 5 and 6. For this purpose the inner pipe section 37a, FIG. 5, is suspended in a mounting cage 43, itself suspended from coupling 44 screwed, welded to or otherwise forming part of the upper end of the outer pipe section 38a. The lower end of coupling 44 rests on the collar 45 of an elevator of the surface gear which supports the double line 39 by means of the cables 46. When section 37a, in course of mounting, is not yet fixed by its coupling 88 to the coupling 87 of the pipe section 37, the base 50 of the mounting cage 43 supports the screwed coupling 64, screwed, welded or otherwise forming part of the upper end of section 37a. Cage 43, FIG. 6, is easily withdrawn after connection of pipe sections 37 and 37a. The cage is formed of two independent parts 48 and 49, bearing against each other at their lower parts which are formed by half rings 50 for retaining coupling 64 of pipe section 37a, the upper parts also being formed of half rings 51, connected to each other by removable hinge pins 47 which pass through appropriate orifices in the half rings 51. To withdraw cage 43 either the pins 47 can be removed or the parts 48, 49 can be pivoted about pins 47 to separate the half rings 50.

The collar formed by the half rings 51 is supported on the upper part of an internal shoulder 52 on the coupling 44 of pipe section 38a. It is self evident that this assembly can be carried out horizontally, on a slope, or vertically.

Depending on the laying and flow line operating conditions, it may be advantageous to tension prestress each section of the internal pipe 37, FIG. 7, with respect to each section of the outer pipe 38. The following procedure is used. The outer pipe 38 is held at its upper end by means of a support platform 53 and by wedges 55, for example, which wedges are controlled by conventional means which are not shown. Permanent support 56 is supported by the upper parts of the shoulder 57 of coupling 58, fixed to the upper part of pipe section 38. A support 59 is installed which supports a jack 60 with a hollow shaft 61 providing a passage for a rod 62 carrying a threaded end 63 which screws into the coupling 64 of the inner pipe section 37. A nut 65, screwed on a threaded part of rod 62, serves as a point of support for the hollow shaft 61 of the hydraulic jack 60. By application of a given pressure through the conduits 66 to jack 60 and by controlling for example the load using a measuring instrument 67 and valve 68, the jack 60 exerts a tractive effect on rod 62 by pushing back nut 65 supported on hollow shaft 61. It is then sufficient to insert blocks 69, e.g. collets, shims, distance pieces, FIG. 8, between the support 56 and the coupling 64, to place the inner pipe section 37 permanently under tension. The shaft 61 of the jack can then be drawn back, the rod 62 unscrewed to free the end piece 63 from coupling 64, and the support 59 and jack 60 withdrawn with the aid of cables 70, for example.

It may alternatively or additionally be necessary to create compression stresses in certain zones in place of traction stresses. In this case, centering pieces 71 are provided in the inner pipe 37, enabling pipe 37 to be maintained on the axis of pipe 38, as is shown in FIG. 9. Compression is effected by means of a jack 72 whose cylinder is supported by a support 73 and whose piston rod 74 bears on a separator 75 which bears on the coupling 76 of the inner pipe 37. Arms 77, articulated at 78 on support 73, are maintained against the coupling 79 of the outer pipe 38 by a simple collar 80, their ends being provided with shoulders which prevent the collar 80 slipping off and also engage under the lower part of coupling 79. This coupling includes an internal shoulder 81, enabling a compression cage 82 to be placed under this shoulder piece, supported by its lower part. Its upper part is threaded to receive a nut 83 with its lower part in contact with the shoulder 84 of the coupling 76. The cage 82 is reinforced by spacing rings 85. When hydraulic pressure is applied to jack 72 via conduits 86, its rod 74 compresses pipe 37 enabling nut 83 to be screwed into cage 82 until the desired prestressing is obtained. Collar 80, jack 72, its support 73 and arms 77 are then withdrawn.

The staggering of the inner pipe 37 and the outer pipe 38, FIGS. 5 and 7, facilitates not only the above prestressing but also enables these forces to be distributed according to the particular circumstances encountered, e.g. bends, cantilevers, other parts of the equipment, etc. In addition, this staggering facilitates assembly and verification of the connections between both the internal or external pipe sections. For example, having assembled a new section 37a of the inner pipe 37, FIG. 5, to the part already assembled, it is easy to ensure that the joint between couplings 87 and 88 is perfectly water-tight by means of an hydrostatic apparatus for checking fluid-tightness. It is then possible to lower support 45 until the threaded part on the lower end 91 of the new section 38a of pipe 38 comes to the level of coupling 89 which also holds the support 90 of pipe 37. After screwing the threaded part 91 into the coupling 89, the tightness of this joint may be verified by means of an hydrostatic fluid-tightness testing apparatus.

Figure 11:
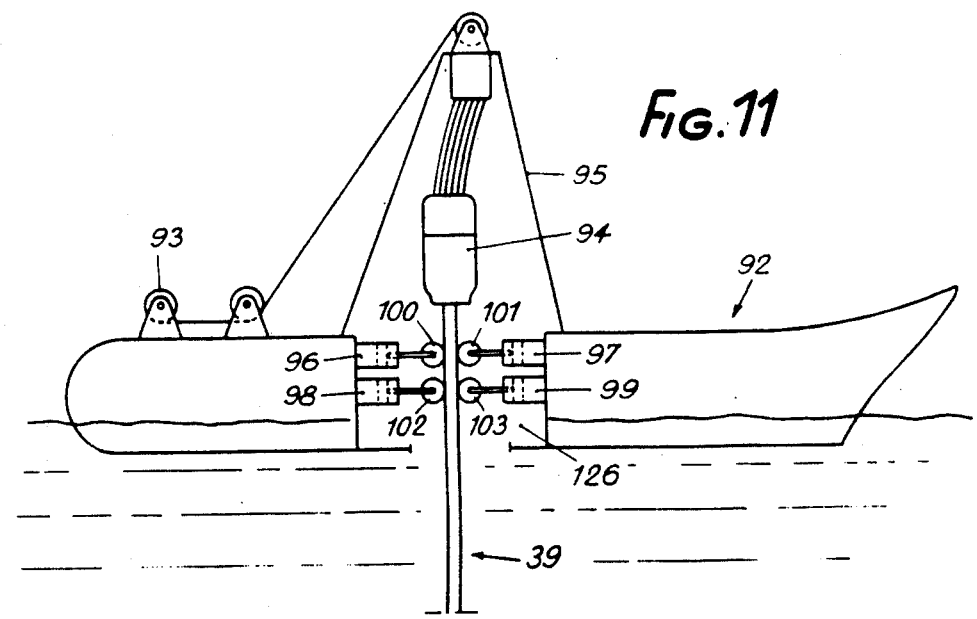
FIG. 11 is a diagrammatic view of surface apparatus used in installation of a flow line.
Figure 12:
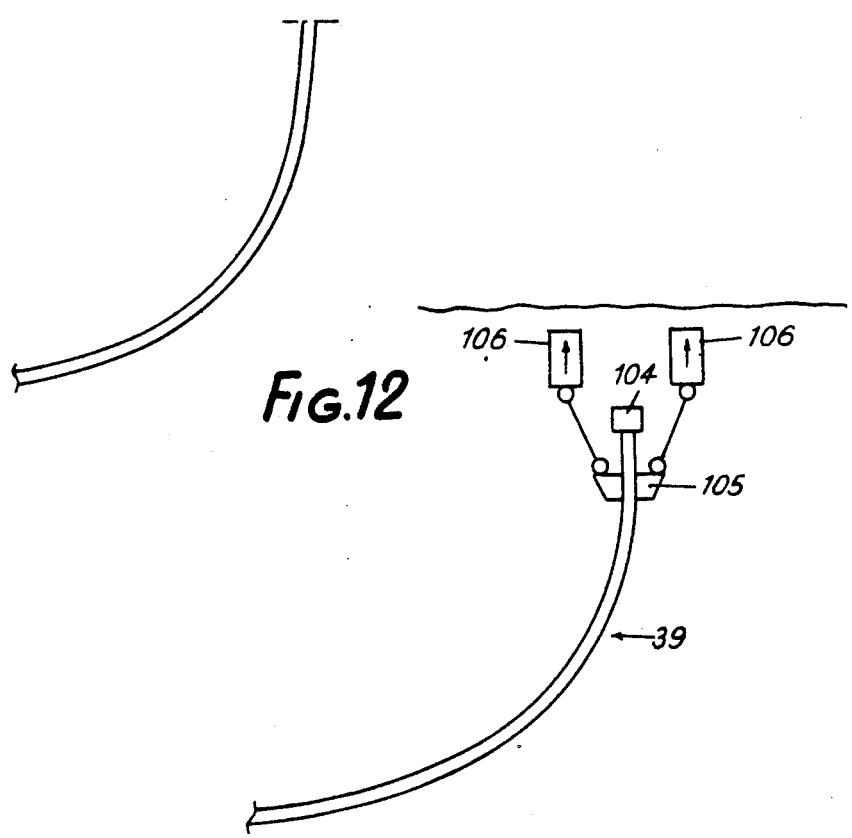
FIG. 12 is a diagrammatic view of the upper end of the flow line during position or disconnecting from the surface gear.

After positioning of the basic structure which terminates the lower part of the simple or multiple flow line, the surface gear represented diagrammatically at 92, FIG. 11, may be progressively moved from the vertical point above the base. The upper end of the line is given an inclination which tends to reduce all stresses greater than a given value at a given point. For this purpose, in addition to the conventional compensated capstan 93 and the elevator 94 suspended from the derrick or gantry 95, jacks 96 to 99 are provided in the well 126, their rods carrying guide pulleys 100 to 103. When it is desired to incline the line 39, either with regard to the axis of the well or with regard to the vertical, it is sufficient to displace one of the pairs of pulleys 100, 101 or 102, 103 with respect to the other pair or to displace the pairs in opposite directions. The jacks 96 to 99 may also be adapted to give an indication of the stresses to which the line is subjected while being laid in position, and therefore to control the stresses. It is possible to move the gear 92 at the same time as the inclined end of the upper part of the line is caused to slide, and in general the inclination of the line may be changed in a manner dependent on the separation from the base. The curve exhibited by the line may also be modified by weighting all or part of it by introducing into it an appropriate liquid. Preferably the line is only partially filled so that its upper end can be freed and can float at any desired level, as is shown in FIG. 12. The upper end of line 39 is closed by closure 104, and floats 106 are fixed to support 105, which can for example be supported on the lower part of the closure 104. By this means the difficult problem of changing the surface gear before the end of the laying process is solved, as is that of preservation of the line during navigation conditions of unfavourable heavy weather.

It will be noted that it is also possible to fix to the upper end of line 39 a further basic structure which carries pivoting connectors similar to connectors 4 and 5 of FIG. 1, if the line 39 has to be connected to another submarine base structure.

FIG. 13, showing the procedure for withdrawing a line, also shows how it is possible to connect the end of a line carrying a basic structure when the other end is connected to a submarine structure. In this Figure the surface appliance 92 carries gripping tool 127, the arms 107 of which carry retractable projections 108 which engage the depressions 109 in the basic structure 110 to which line 39 is connected by means of pivotable connections 113 such as those shown at 4 and 5 in FIG. 1. The tool-holder 127 is preferably supported by a suspension 111 through an articulated link 112 having its axis of rotation parallel to the axes of rotation of the pivots 113. The means of linking the basic structure 110 to the base 115 may be of any nature and so are not shown. These links are either simple remote-controlled mechanical links, or links comprising further water-tight connections and provided with appropriate remote-controlled valves 116, for example. Before withdrawal, the line 39 may be emptied so as to lighten assembly.

FIG. 14 shows an exemplary form of basic structure. As shown the line 117 has branches 118 rotatable about axis 119 of the basic structure 120. When structure 120 is connected to base 124, locking means 121 engage in notches 122 and tubes 123 are automatically connected to vertical tubes in the base 124. The structure 120 is intended to receive other structures of similar types, grooves 125 enabling an upper structure, not shown, to be fixed thereto. It will be seen that it suffices to cause the branches 118 to pivot about axis 119 to permit the upper structure to be placed in position. In this manner it is possible to form a complete oil well head without having to connect the collector lines on the sea bed as in previous processes by use of divers or by complex automatic handling means. In the same way an oil-gas separator or a storage reservoir, or any other installation can be connected, whatever the depth. It is of interest to note that this method of laying flow lines eliminates application of undesirable loads to the base by the flow line, and also enables parts of a sea bed drilling or production unit to be withdrawn easily, the withdrawal taking the same procedure as for positioning but in the reverse order.

It will be understood that any joints obtained by screwing may also be made by welding or may be of any desired type. The flexibility of the above method enables all types of surface appliances to be used, enables anti-hammering devices to be used, enables use of ramps of predetermined profile for guiding the upper end of the flow line after positioning of the basic structure on the base. Further, the recovery of all or part of the line is facilitated.

The basic structures may be of any type and the example shown in FIG. 4 intentionally does not have a central opening. Depending on requirements, the orientation units 33 and 34 may alternatively be arranged within the thickness of the structure 42 rather than above it, the orifices 33a and 34a being positioned on the edges of the structure, thus leaving, as in the example of FIG. 2, a central space sufficient for passage of all the elements belonging to a base structure. The valves 40 and 41, which may also be provided in addition to valves 8 and 9, may be of any suitable type.

What is claimed is:

1. A method of laying and connecting a flow line to a submerged base structure, wherein an end portion of the line to be connected to the submerged base structure has an albow portion, and a connection at the end of the elbow portion, said connection being capable of pivoting about the axis of the elbow portion and forming part of a basic structure for vertical connection to the submerged base structure, the method comprising the steps of a) holding the basic structure fixed relative to the end portion of the flow line by operation of a locking apparatus rigidly connecting the elbow portion to the connection; b) progressively submerging the flow line in alignment with the submerged base structure until the basic structure coincides with connecting means on the submerged base structure; and, c) unlocking the locking apparatus so that the elbow portion of the flow line pivots freely about its axis relative to the basic structure.

2. A method as claimed in claim 1 wherein the flow line comprises a plurality of pipe sections, the pipe sections being connected together as the line is submerged.

3. A method as claimed in claim 2, wherein further pipe sections are assembled after the locking apparatus has been unlocked, the further pipe sections being inclined to the vertical from the location of the submerged structure to minimize the stresses applied to the collector line.

4. A method as claimed in claim 1 wherein the end portion of the flow line to be connected to the submerged base structure comprises two brances which are symmetrical relative to the longitudinal axis of the flow line, each branch being elbowed and pivoting about the axis of a connection forming part of the basic structure, the axes being perpendicular to the axis of symmetry of the branches, at least one of the branches being fixed relative to the basic structure by the locking apparatus during descent of the line and the connection of the basic structure to the submerged base structure.

5. A method as claimed in claim 4, wherein the flow line comprises concentric pipes each formed of sections, one of the branches passing into a pipe section which is connected to the other branch and the joints between the inner pipe sections being axially staggered relative to the joints between the outer pipe sections.

6. A method as claimed in claim 4 wherein at least one flow line pipe section is prestressed in accordance with its position in the line and the length of the line.

7. A method as claimed in claim 6, wherein an inner pipe section is tension prestressed by a) inserting around the inner pipe section a member bearing underneath a coupling on the pipe section and on a support itself bearing on an internal shoulder of an adjacent coupling between outer pipe sections; and, b) adjusting the height of the member corresponding to the value of the prestress applied by a ram pulling the coupling on the inner pipe section while bearing on the upper portion of the coupling of the outer pipe sections.

8. A method as claimed in claim 6, wherein an inner pipe section is compression prestressed by, a) inserting around the upper portion of the inner pipe section a compression cage bearing, by a lower portion on a lower portion of an internal shoulder of an adjacent coupling between outer pipe sections and by an internally threaded upper portion, on a nut slidable on the upper portion of the upper coupling of the inner pipe section and abutting against a shoulder on the coupling; and, b) compressing the inner pipe section by a ram bearing on the coupling and on a support bearing below an outer portion of the coupling between the outer pipe sections, the nut being tightened in the compression cage.

9. A method as claimed in claim 6 wherein centering members are inserted between the inner and outer pipes.

10. A method as claimed in claim 1 comprising the further step of weighting at least a part of the flow line during assembly and laying of the line.

11. A method as claimed in claim 1 comprising the further steps of a) blocking the upper end of the flow line; b) attaching a buoy thereto; and c) releasing the line, the buoyancy of the buoy being selected in accordance with prestresses in the line and the length and weight of the line to minimize stresses applied to the line.

12. A method as claimed in claim 1 wherein the laid line is withdrawn by a) unlocking the locking apparatus, and b) returning the basic structure to the surface, the flow line swivelling relative to the basic structure.

13. A method as claimed in claim 1 comprising the further steps of indicating the stresses to which the line is subjected during laying thereof the pressures of the control fluids of jacks, the pistons of which carry rolling means bearing on opposite sides of an upper portion of the line, the jacks being operable to vary the inclination of the line and thereby reduce the stresses.

14. Apparatus for guiding a flow line from a surface structure while it is being laid underwater comprising two pairs of controllable jacks attached to the surface structure, the rod of each jack carrying a guide pulley which bears against the flow line, the rods of the jacks of each pair being positioned on respective sides of the path of a flow line and being movable in the same directions, the rods of one pair being movable relative to the rods of the other pair in opposite directions, to impart a required inclination to the upper end portion of the flow line.

15. A flow line connected to a basic structure for use in connecting said basic structure to a submerged base structure comprising a) an end pipe section having an elbow portion capable of swivelling about the axis of a connection to the basic structure, the axis being perpendicular to the longitudinal axis of the pipe section adjacent the elbow portion; b) locking and unlocking apparatus interconnecting the elbow portion and the connection, said apparatus operable to rigidly connect the elbow portion and the connection, the connection being supported on said basic structure such that said basic structure will be in a vertical connection position when the axis of the pipe section adjacent the elbow portion is vertical.

16. A flow line as claimed in claim 15, wherein the end pipe section comprises two relatively symmetrical branches, each branch being elbowed and pivoting about the axis of a connection carried by the vertical connection structure, the axes of the connections being aligned and perpendicular to the axis of symmetry of the branches, at least one of the branches being connected to the structure by the locking and unlocking apparatus.

17. A flow line as claimed in claim 16, wherein the upper portion of the end pipe section is formed of an inner pipe section connected to one of the branches and an outer pipe section connected to the other branch.

18. A flow line as claimed in claim 17, including a plurality of inner and outer pipe sections, wherein the joints between adjacent inner and outer pipe sections are axially staggered relative to each other by a distance sufficient to permit insertion of an apparatus for checking the fluid-tightness of the joint between two adjacent inner pipe sections.

19. A flow line as claimed in claim 18, wherein the joints between adjacent outer pipe sections have internal shoulders and couplings of the inner pipe sections have external shoulders, such that permanent cages for maintaining tension or compression prestressing of inner pipe sections can bear on the internal and external shoulders.

20. A flow line as claimed in claim 18 including centering means between the inner and outer pipe sections.

21. A flow line as claimed in claim 15, wherein the basic structure is provided with means for attachment of hauling means and vertical descent guiding means.

22. A flow line as claimed in claim 21, wherein the guiding means comprises a central orifice for the passage of a portion of a base structure therethrough and of peripheral orifices for the passage of guide cables therethrough.

23. A flow line as claimed in claim 21, wherein the guiding means comprises means for indicating the position occupied by the vertical connection structure and jet-propulsion means.

* * * * *

UNITED STATES PATENT OFFICE
CERTIFICATE OF CORRECTION

Patent No. 3,953,982          Dated May 4, 1976

Inventor(s) Michael D. PENNOCK

It is certified that error appears in the above-identified patent and that said Letters Patent are hereby corrected as shown below:

Col. 3, Line 27, delete ", for example draw- , ".

Col. 4, Line 8, delete "sufficies", insert --suffices--.

Col. 4, Line 52, delete "wedges 55", insert --wedges 54--.

Col. 6, Line 29, after "engage", delete "the", insert --in--.

Col. 7, Line 49, delete "brances", insert --branches--.

Signed and Sealed this

Twenty-fourth Day of August 1976

[SEAL]

Attest:

RUTH C. MASON
*Attesting Officer*

C. MARSHALL DANN
*Commissioner of Patents and Trademarks*